US012420241B2

(12) United States Patent
Wang et al.

(10) Patent No.: US 12,420,241 B2
(45) Date of Patent: Sep. 23, 2025

(54) LAYERED BIMETALLIC HYDROXIDE-BASED HYDROGEL BIPOLAR MEMBRANE AND METHOD FOR PREPARING SAME

(71) Applicant: TONGJI UNIVERSITY, Shanghai (CN)

(72) Inventors: Zhiwei Wang, Shanghai (CN); Wei Shi, Shanghai (CN); Lijun Meng, Shanghai (CN); Xueye Wang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 92 days.

(21) Appl. No.: 18/530,330

(22) Filed: Dec. 6, 2023

(65) Prior Publication Data

US 2025/0025841 A1 Jan. 23, 2025

(30) Foreign Application Priority Data

Jul. 18, 2023 (CN) .......................... 202310883293.1

(51) Int. Cl.
*B01D 69/12* (2006.01)
*B01D 61/44* (2006.01)
(Continued)

(52) U.S. Cl.
CPC ......... *B01D 69/125* (2013.01); *B01D 61/445* (2013.01); *B01D 69/02* (2013.01);
(Continued)

(58) Field of Classification Search
CPC .......................... B01D 61/445; B01D 69/1216
See application file for complete search history.

(56) References Cited

U.S. PATENT DOCUMENTS 6,217,733 B1 * 4/2001 Hurwitz .............. B32B 37/0038
204/632
6,924,318 B2 * 8/2005 Mischi ................. B01D 61/445
521/27

OTHER PUBLICATIONS

R. Pärnamäe et al, Bipolar membranes: A review on principles, latest developments, and applications,Journal of Membrane Science, vol. 617, 2021, 118538.*

* cited by examiner

Primary Examiner — Alex A Rolland
(74) Attorney, Agent, or Firm — Troutman Pepper Locke LLP; Tim Tingkang Xia, Esq.

(57) ABSTRACT

The present disclosure relates to a layered bimetallic hydroxide-based hydrogel bipolar membrane and a method for preparing the same. The method includes: blade-coating a quaternized polyethersulfone solution on a substrate, and carrying out drying to obtain an anion exchange layer; immersing the layer sequentially and cyclically in a sodium alginate solution and a first metal ion mixed solution to obtain a hydrogel anion exchange membrane; immersing the hydrogel membrane sequentially in a second metal ion mixed solution and an alkaline solution; and blade-coating a sulfonated polyethersulfone solution on the obtained membrane, and carrying out drying to obtain the layered bimetallic hydroxide-based hydrogel bipolar membrane. The anion and cation exchange membrane layers on two sides of the bipolar membrane prepared in the present disclosure are closely bound by way of hydrogel cross-linking. The bipolar membrane has the advantages of high water dissociation efficiency, low energy consumption, and good stability.

9 Claims, 7 Drawing Sheets

(51) Int. Cl.
*B01D 69/02* (2006.01)
*B01D 71/68* (2006.01)
*C08J 5/22* (2006.01)
*C25B 13/02* (2006.01)
*C25B 13/08* (2006.01)

(52) U.S. Cl.
CPC ......... *B01D 69/1216* (2022.08); *B01D 71/68* (2013.01); *C08J 5/2256* (2013.01); *B01D 2325/04* (2013.01); *B01D 2325/42* (2013.01); *C08J 2381/06* (2013.01); *C25B 13/02* (2013.01); *C25B 13/08* (2013.01)

LAYERED BIMETALLIC HYDROXIDE-BASED HYDROGEL BIPOLAR MEMBRANE AND METHOD FOR PREPARING SAME

CROSS-REFERENCE TO RELATED PATENT APPLICATION

This non-provisional application claims priority to and the benefit of, pursuant to 35 U.S.C. § 119(a), patent application Serial No. CN 202310883293.1 filed in China on Jul. 18, 2023. The disclosure of the above application is incorporated herein in its entirety by reference.

TECHNICAL FIELD

The present disclosure relates to the technical field of bipolar membranes, and in particular to a layered bimetallic hydroxide-based hydrogel bipolar membrane and a method for preparing the same.

BACKGROUND

A bipolar membrane is a new type of composite ion exchange membrane including an anion exchange membrane layer, a cation exchange membrane layer, and an intermediate interface layer. When reverse bias is applied across the bipolar membrane, under the action of an external electric field, since neither cations nor anions can pass through the anion exchange membrane layer and the cation exchange membrane layer of the bipolar membrane, an internal current cannot be loaded by ions in a bulk solution; and water molecules located in the intermediate interface layer will undergo a water dissociation reaction, thereby generating hydrogen ions and hydroxide ions to load the current. Besides, under the action of the electric field, the hydrogen ions and the hydroxide ions move to the polar chambers on two sides of the bipolar membrane, thereby converting a salt solution in a feed liquid from an electrode chamber into corresponding acids and bases. Because the process of producing acids and bases in the bipolar membrane does not involve generation of harmful gases, the bipolar membrane has been widely used in the fields of energy conversion and storage, clean production, wastewater resource treatment, and the like, such as hydrogen production via water electrolysis by a bipolar membrane, a bipolar membrane-enabled flow battery, wastewater treatment and resource utilization using a bipolar membrane, etc.

In the process of water dissociation, the intermediate catalyst layer in the bipolar membrane is crucial, and the dissociation rate of water mainly depends on the efficiency of the catalyst. It has been proved that many catalysts, such as carboxylate, silane, PEDOT, BiOCl, Fe-MIL-101-$NH_2$, PEI, lysozyme, graphene oxide, MOF, TiOH, ZrOH, RCOONa, and metal oxides, can improve the dissociation rate of water and reduce the overpotential to some extent. However, their application is limited by the low efficiency, low water diffusion rate, low ion migration rate, and instability of bipolar membranes based on these catalysts. In addition, in the practical application process of the bipolar membrane, the catalyst in the intermediate interface layer is not closely bound with the anion and cation exchange membrane layers on two sides. In this way, it is easy to cause catalyst release and membrane delamination, which leads to increased water dissociation voltage, lowered water dissociation performance, and reduced acid and base production efficiency, thereby affecting the stability of the bipolar membrane and limiting the large-scale application and industrial development of the bipolar membrane. Therefore, it is crucial to develop an electrode material with good catalytic effect on water dissociation, close binding of membrane layers, and high stability.

The related art still needs to be improved and developed.

SUMMARY

In view of the above defects in the related art, an objective of the present disclosure is to provide a layered bimetallic hydroxide-based hydrogel bipolar membrane and a method for preparing the same, in order to solve the technical problems of poor stability and limited water dissociation efficiency in the existing bipolar membranes.

The technical solutions of the present disclosure are as follows:

Provided is a method for preparing a layered bimetallic hydroxide-based hydrogel bipolar membrane, including:
  blade-coating a quaternized polyethersulfone anion exchange membrane solution on a substrate, and carrying out drying to obtain an anion exchange membrane layer;
  immersing the anion exchange membrane layer sequentially and cyclically in a sodium alginate solution and a first metal ion mixed solution for hydrogel cross-linking to obtain a hydrogel anion exchange membrane;
  immersing the hydrogel anion exchange membrane sequentially in a second metal ion mixed solution and an alkaline solution to obtain a layered bimetallic hydroxide-based hydrogel anion exchange membrane; and
  blade-coating a sulfonated polyethersulfone cation exchange resin solution on the layered bimetallic hydroxide-based hydrogel anion exchange membrane, and carrying out drying to obtain the layered bimetallic hydroxide-based hydrogel bipolar membrane.

According to the method for preparing a layered bimetallic hydroxide-based hydrogel bipolar membrane, the quaternized polyethersulfone anion exchange membrane solution includes an organic solvent and quaternized polyethersulfone powder particles dispersed in the organic solvent. A mass concentration of the quaternized polyethersulfone anion exchange membrane solution is 1-20 wt. %.

According to the method for preparing a layered bimetallic hydroxide-based hydrogel bipolar membrane, the anion exchange membrane layer has a thickness of 10-100 µm.

According to the method for preparing a layered bimetallic hydroxide-based hydrogel bipolar membrane, a concentration of the sodium alginate solution is 0.01-2 g/L, and a total molar concentration of metal ions in the first metal ion mixed solution is 1-1000 mM.

According to the method for preparing a layered bimetallic hydroxide-based hydrogel bipolar membrane, a total molar concentration of metal ions in the second metal ion mixed solution is 0.01-5 M.

According to the method for preparing a layered bimetallic hydroxide-based hydrogel bipolar membrane, the first metal ion mixed solution and the second metal ion mixed solution are independently selected from one or more of magnesium, calcium, aluminum, iron, cobalt, nickel, copper, zinc, and manganese.

According to the method for preparing a layered bimetallic hydroxide-based hydrogel bipolar membrane, the alkaline solution is one or more of sodium hydroxide, sodium carbonate, sodium bicarbonate, potassium hydroxide, potassium carbonate, and potassium bicarbonate.

According to the method for preparing a layered bimetallic hydroxide-based hydrogel bipolar membrane, the hydrogel anion exchange membrane is immersed in the second metal ion mixed solution for 0.01-10 h, and in the alkaline solution for 0.01-10 h.

According to the method for preparing a layered bimetallic hydroxide-based hydrogel bipolar membrane, the sulfonated polyethersulfone cation exchange membrane solution includes an organic solvent and sulfonated polyethersulfone powder particles dispersed in the organic solvent. A mass concentration of the sulfonated polyethersulfone cation exchange membrane solution is 1-20 wt. %.

Provided is a layered bimetallic hydroxide-based hydrogel bipolar membrane, prepared by the method for preparing a layered bimetallic hydroxide-based hydrogel bipolar membrane provided in the present disclosure.

Beneficial effects: According to the layered bimetallic hydroxide-based hydrogel bipolar membrane prepared in the present disclosure, by using the characteristics of close cross-linking and high water permeability of the hydrogel, the stability and water mass transfer rate of the bipolar membrane are improved. By using the coordination characteristics between hydrogel and metal, the layered bimetallic hydroxide is uniformly distributed in the hydrogel, which increases catalytic active sites of water dissociation and improves the utilization rate of the catalyst, thereby realizing rapid dissociation of water at low voltage and improving the acid and base production rate. Therefore, the anion and cation exchange membrane layers on two sides of the bipolar membrane prepared in the present disclosure are closely bound by way of hydrogel cross-linking. The bipolar membrane has the advantages of high water dissociation efficiency, low energy consumption, and good stability, and solves the problems of poor stability and limited water dissociation efficiency in the existing bipolar membrane.

DETAILED DESCRIPTION

The present disclosure provides a layered bimetallic hydroxide-based hydrogel bipolar membrane and a method for preparing the same. In order to make the objectives, technical solutions, and effects of the present disclosure clearer and more explicit, the present disclosure will be further described in detail below. It should be understood that the specific examples described herein are merely illustrative of the present disclosure and are not intended to limit the present disclosure.

Figure 1:
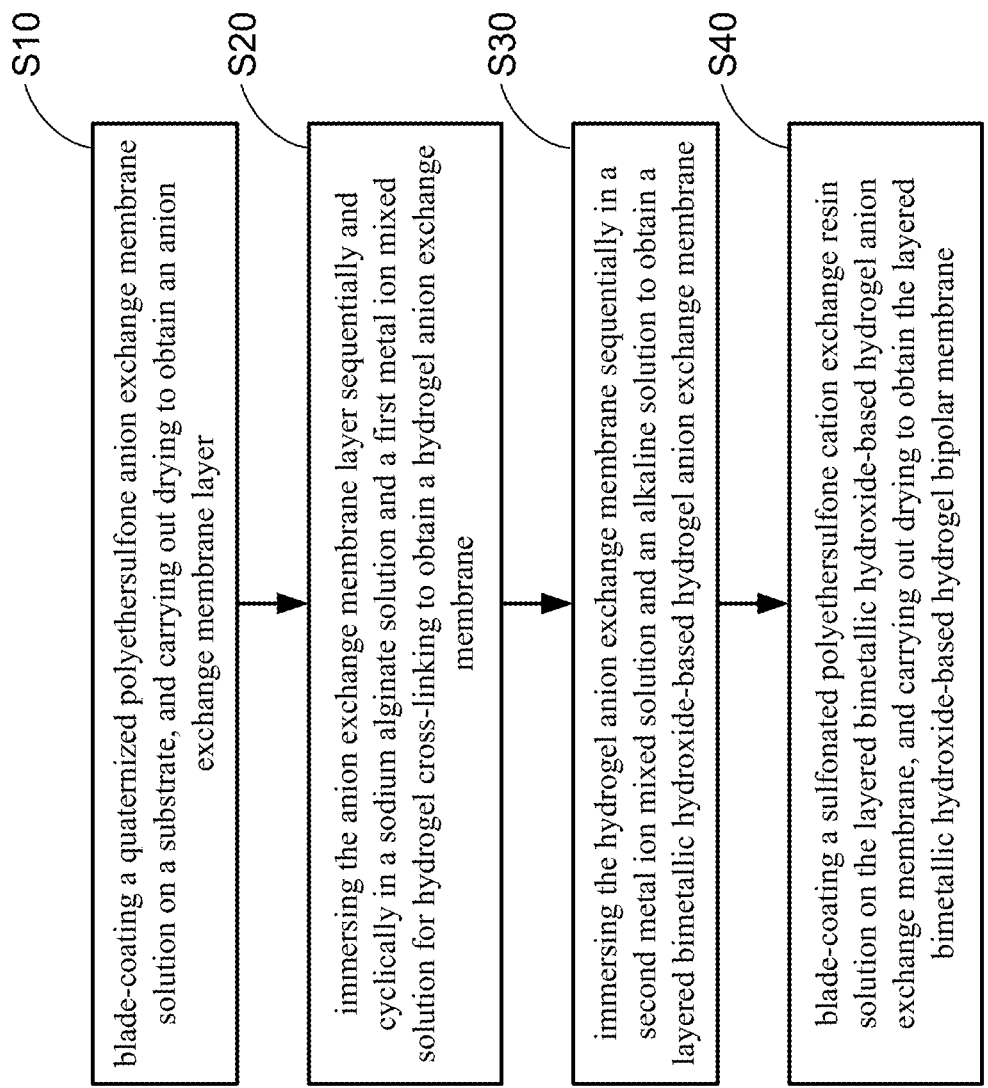
FIG. 1 is a flowchart of a method for preparing a layered bimetallic hydroxide-based hydrogel bipolar membrane according to the present disclosure.

Referring to FIG. 1, FIG. 1 is a flowchart of a method for preparing a layered bimetallic hydroxide-based hydrogel bipolar membrane according to the present disclosure. As shown in the figure, the method includes:

S10: blade-coating a quaternized polyethersulfone anion exchange membrane solution on a substrate, and carrying out drying to obtain an anion exchange membrane layer;

S20: immersing the anion exchange membrane layer sequentially and cyclically in a sodium alginate solution and a first metal ion mixed solution for hydrogel cross-linking to obtain a hydrogel anion exchange membrane;

S30: immersing the hydrogel anion exchange membrane sequentially in a second metal ion mixed solution and an alkaline solution to obtain a layered bimetallic hydroxide-based hydrogel anion exchange membrane; and S40: blade-coating a sulfonated polyethersulfone cation exchange membrane solution on the layered bimetallic hydroxide-based hydrogel anion exchange membrane, and carrying out drying to obtain the layered bimetallic hydroxide-based hydrogel bipolar membrane.

Figure 2:
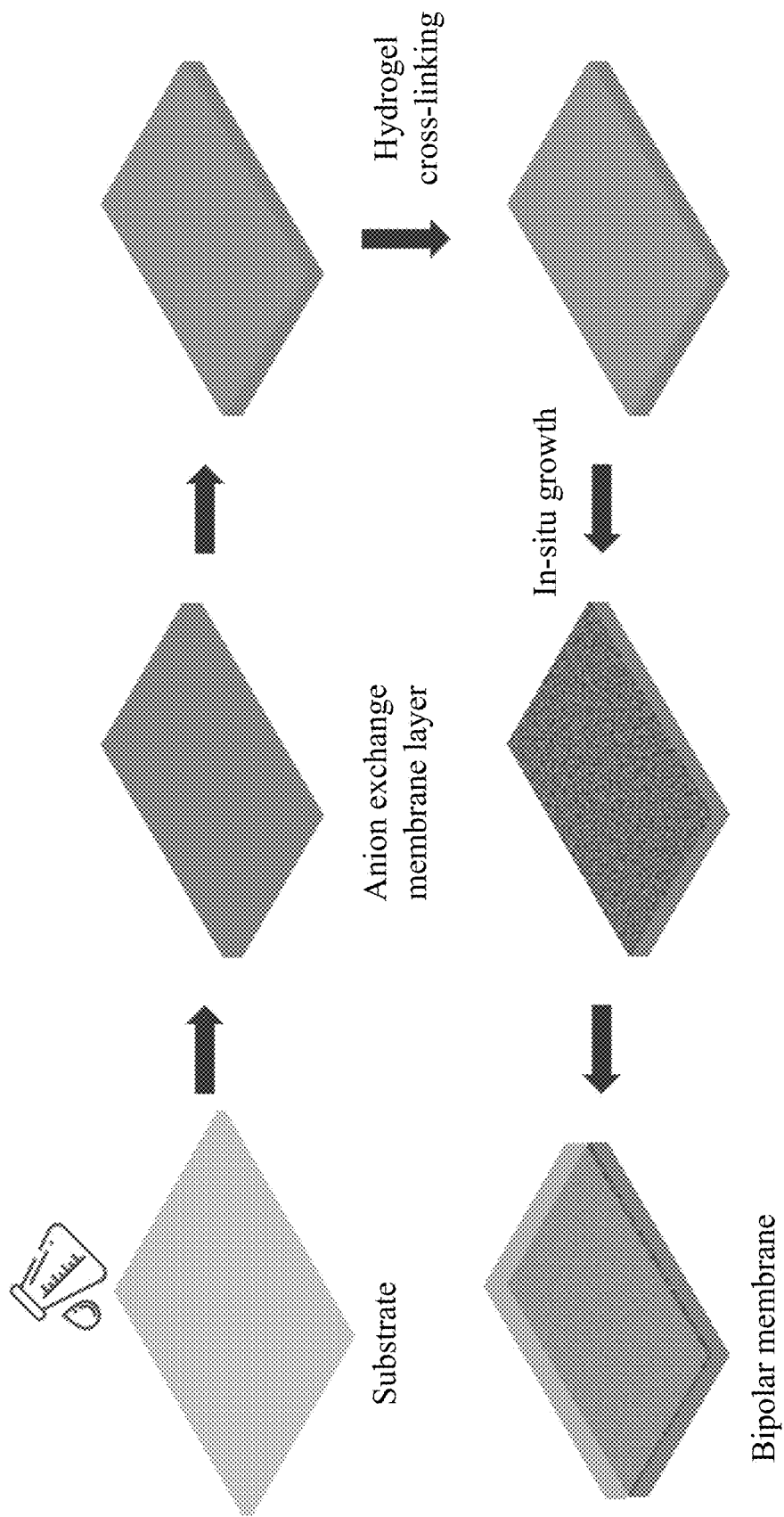
FIG. 2 is a schematic diagram of the method for preparing a layered bimetallic hydroxide-based hydrogel bipolar membrane according to Example 1 of the present disclosure.

Specifically, as shown in FIG. 2, first, quaternized polyethersulfone powder particles are dispersed in an organic solvent to obtain a quaternized polyethersulfone anion exchange membrane solution with a mass concentration of 1-20 wt. %. Then, the quaternized polyethersulfone anion exchange membrane solution is blade-coated on a substrate, and dried to obtain an anion exchange membrane layer having a thickness of 10-100 μm. A sodium alginate solution with a concentration of 0.01-2 g/L and a first metal ion mixed solution with a total molar concentration of metal ions of 1-1000 mM are prepared. The anion exchange membrane layer is sequentially immersed in the sodium alginate solution and the first metal ion mixed solution for hydrogel cross-linking, 0.1-60 min in each solution, for 1-10 cycles, thereby obtaining a hydrogel anion exchange membrane. It is not necessary to keep the times of immersion in the two solutions the same. Next, a second metal ion mixed solution with a total molar concentration of metal ions of 0.01-5 M and an alkaline solution are prepared. The hydrogel anion exchange membrane is sequentially immersed in the second metal ion mixed solution and the alkaline solution, 0.01-10 h in each solution, thereby obtaining a layered bimetallic hydroxide-based hydrogel anion exchange membrane. Sulfonated polyethersulfone powder particles are dispersed in an organic solvent to obtain a sulfonated polyethersulfone cation exchange membrane solution with a mass concentration of 1-20 wt. %. Finally, the sulfonated polyethersulfone cation exchange membrane solution is blade-coated on the layered bimetallic hydroxide-based hydrogel anion exchange membrane, and dried to obtain the layered bimetallic hydroxide-based hydrogel bipolar membrane.

According to the layered bimetallic hydroxide-based hydrogel bipolar membrane prepared in the present disclosure, by using the characteristics of close cross-linking and high water permeability of the hydrogel, the stability and water mass transfer rate of the bipolar membrane are improved. By using the coordination characteristics between hydrogel and metal, the layered bimetallic hydroxide is uniformly distributed in the hydrogel, which increases catalytic active sites of water dissociation and improves the utilization rate of the catalyst, thereby realizing rapid dissociation of water at low voltage and improving the acid and base production rate. Therefore, the anion and cation exchange membrane layers on two sides of the bipolar membrane prepared in the present disclosure are closely bound by way of hydrogel cross-linking. The bipolar membrane has the advantages of high water dissociation efficiency, low energy consumption, and good stability, and solves the problems of poor stability and limited water dissociation efficiency in the existing bipolar membrane.

In some embodiments, the first metal ion mixed solution and the second metal ion mixed solution are independently selected from one or more of magnesium, calcium, aluminum, iron, cobalt, nickel, copper, zinc, and manganese, but are not limited thereto.

In some embodiments, the alkaline solution is one or more of sodium hydroxide, sodium carbonate, sodium bicarbonate, potassium hydroxide, potassium carbonate, and potassium bicarbonate, but are not limited thereto.

In some embodiments, a layered bimetallic hydroxide-based hydrogel bipolar membrane is further provided, which is prepared by the method for preparing a layered bimetallic hydroxide-based hydrogel bipolar membrane according to the present disclosure.

The present disclosure will be further explained by way of specific examples:

Example 1

This example provides a method for preparing a layered bimetallic hydroxide-based hydrogel bipolar membrane, including the following steps:
(1) A quaternized polyethersulfone anion exchange membrane solution containing 10 wt. % (mass concentration) of quaternized polyethersulfone was blade-coated on a substrate, and dried to obtain an anion exchange membrane layer.
(2) The anion exchange membrane layer obtained in step (1) was sequentially immersed in a 0.2 g/L sodium alginate solution and a mixed solution with a total concentration of metal ions of 100 mM (nickel:iron:calcium=1:1:2) for hydrogel cross-linking, 10 min in each solution, for 2 cycles, thereby obtaining a hydrogel anion exchange membrane.
(3) The hydrogel anion exchange membrane obtained in step (2) was sequentially immersed in a mixed solution with a total concentration of metal ions (nickel:iron=1: 1.5) of 0.5 M and a 50 mM sodium hydroxide alkaline solution, 0.2 h in each solution, thereby obtaining a layered bimetallic hydroxide-based hydrogel anion exchange membrane.
(4) A sulfonated polyethersulfone cation exchange membrane solution containing 10 wt. % (mass concentration) of sulfonated polyethersulfone was blade-coated on the layered bimetallic hydroxide-based hydrogel anion exchange membrane obtained in step (3), and dried to obtain the layered bimetallic hydroxide-based hydrogel bipolar membrane.

Figure 3:
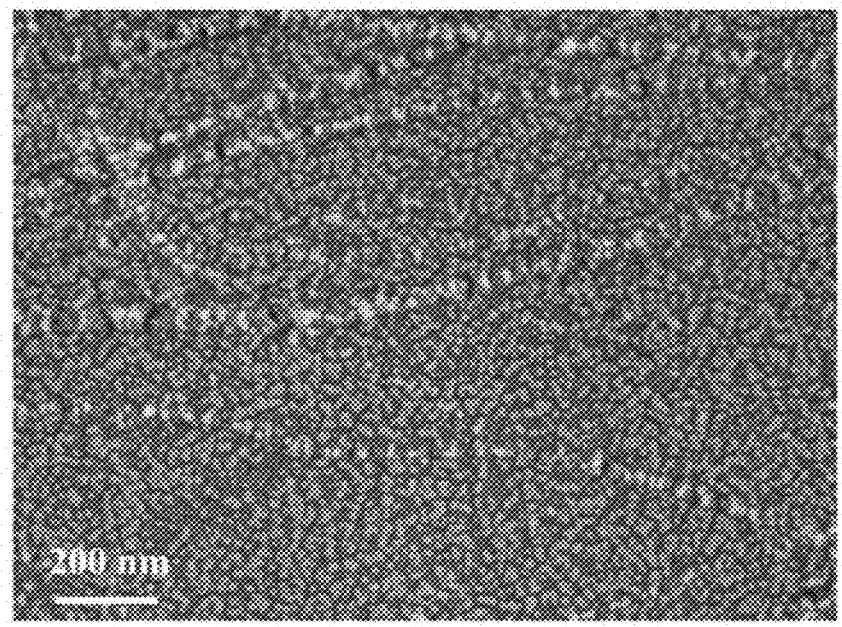
FIG. 3 is an SEM image of a hydrogel anion exchange membrane layer prepared in Example 1 of the present disclosure.
Figure 4:
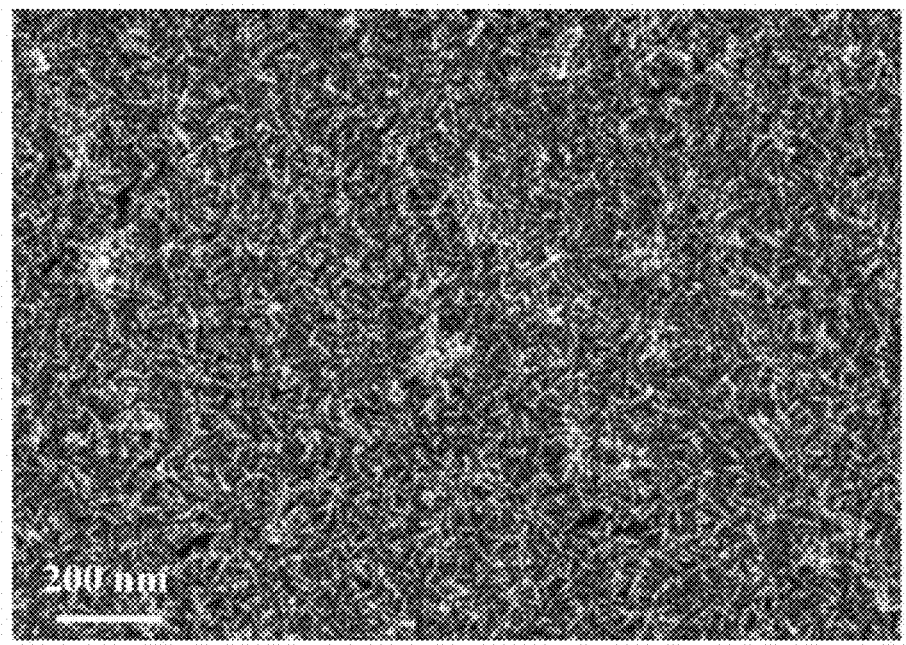
FIG. 4 is an SEM image of a layered bimetallic hydroxide-based hydrogel anion exchange membrane layer prepared in Example 1 of the present disclosure.
Figure 5:
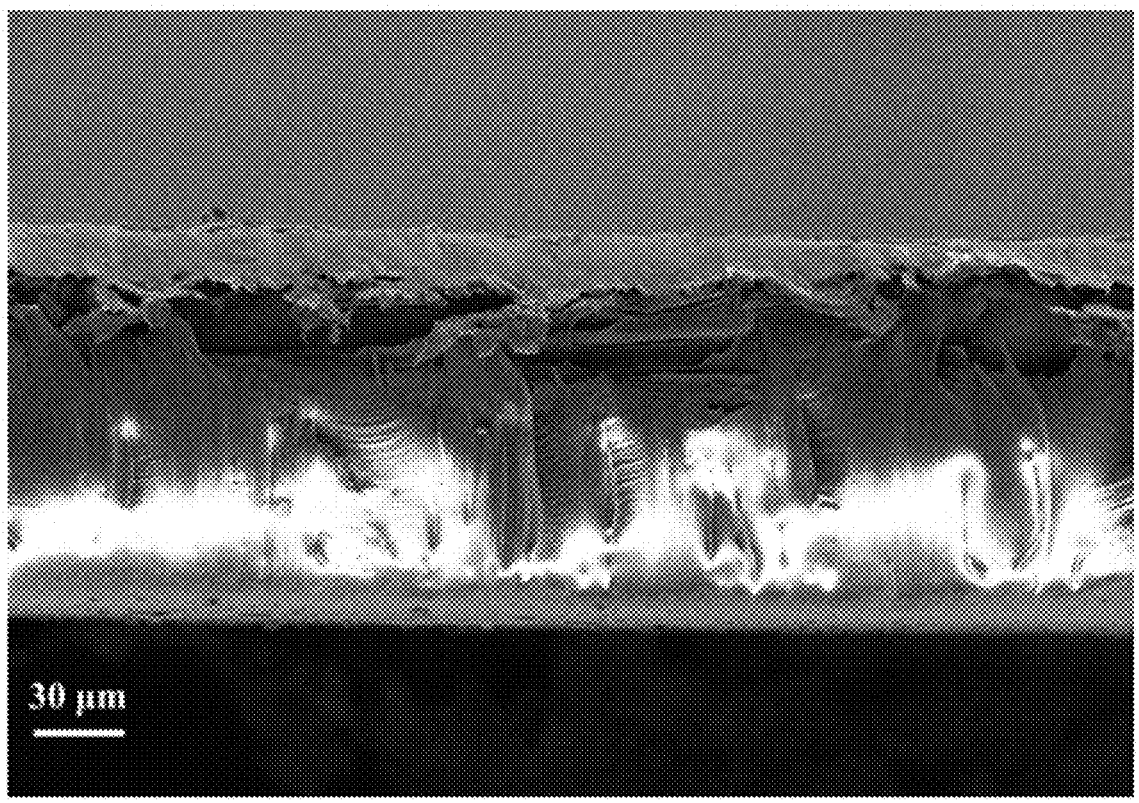
FIG. 5 is an SEM image of a cross section of the layered bimetallic hydroxide-based hydrogel bipolar membrane prepared in Example 1 of the present disclosure.

The membrane layers obtained in each stage in Example 1 were photographed by a scanning electron microscope. The SEM image of the hydrogel anion exchange membrane obtained in step (2) is shown in FIG. 3. As can be seen, the metal particles are uniformly distributed on the flat membrane surface. The SEM image of the layered bimetallic hydroxide-based hydrogel anion exchange membrane obtained by growing layered bimetallic hydroxide on such basis is shown in FIG. 4. The layered bimetallic hydroxide is a fine lamellar material grown in the membrane. The SEM image of the cross section of the finally obtained bipolar membrane is shown in FIG. 5, which shows an obvious three-layer structure.

Figure 6:
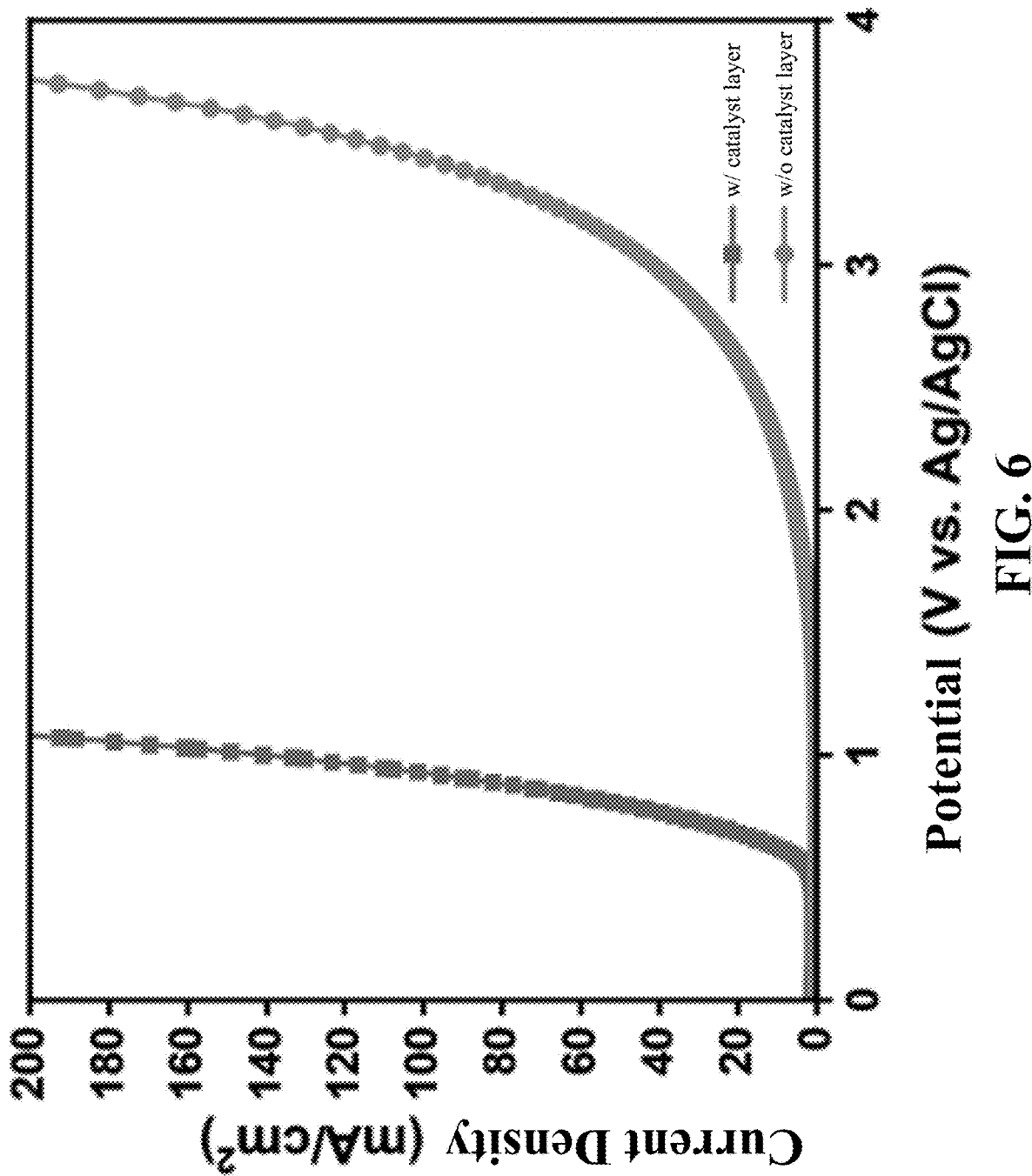
FIG. 6 is a comparison diagram of current-potential curves of the layered bimetallic hydroxide-based hydrogel bipolar membrane prepared by the method provided in Example 1 of the present disclosure and a bipolar membrane without layered bimetallic hydroxide, tested in a 500 mmol/L NaCl electrolyte solution, with platinum sheets as a counter electrode and a working electrode, and Ag/AgCl electrodes as a reference electrode and a working sensing electrode.

A current-potential curve of the layered bimetallic hydroxide-based hydrogel bipolar membrane prepared in Example 1, tested in a 500 mmol/L NaCl electrolyte solution, with platinum sheets as a counter electrode and a working electrode, and Ag/AgCl electrodes as a reference electrode and a working sensing electrode, is shown in FIG. 6. The result shows that at the current density of 100 mA/cm$^2$, the voltage required for water dissociation of the bipolar membrane is 0.93 V, which is better than that of the bipolar membrane without a layered bimetallic hydroxide-based hydrogel catalyst layer.

Example 2

This example provides a method for preparing a layered bimetallic hydroxide-based hydrogel bipolar membrane, specifically including:
(1) A quaternized polyethersulfone anion exchange membrane solution containing 12 wt. % (mass concentration) of quaternized polyethersulfone was blade-coated on a substrate, and dried to obtain an anion exchange membrane layer.
(2) The anion exchange membrane layer obtained in step (1) was sequentially immersed in a 0.4 g/L sodium alginate solution and a mixed solution with a total concentration of metal ions of 120 mM (nickel:iron=1: 1) for hydrogel cross-linking, 5 min in each solution, for 3 cycles, thereby obtaining a hydrogel anion exchange membrane.
(3) The hydrogel anion exchange membrane obtained in step (2) was sequentially immersed in a mixed solution with a total concentration of metal ions (nickel: iron=0.1:1) of 1 M and a 100 mM sodium hydroxide alkaline solution, 0.5 h in each solution, thereby obtaining a layered bimetallic hydroxide-based hydrogel anion exchange membrane.
(4) A sulfonated polyethersulfone cation exchange membrane solution containing 10 wt. % (mass concentration) of sulfonated polyethersulfone was blade-coated on the layered bimetallic hydroxide-based hydrogel anion exchange membrane obtained in step (3), and dried to obtain the layered bimetallic hydroxide-based hydrogel bipolar membrane.

A current-potential curve of the layered bimetallic hydroxide-based hydrogel bipolar membrane prepared in Example 2, tested in a 500 mmol/L NaCl electrolyte solution, with platinum sheets as a counter electrode and a working electrode, and Ag/AgCl electrodes as a reference electrode and a working sensing electrode, shows that at the current density of 100 mA/cm², the voltage required for water dissociation of the bipolar membrane is 1.38 V.

Example 3

This example provides a method for preparing a layered bimetallic hydroxide-based hydrogel bipolar membrane, specifically including:
(1) A quaternized polyethersulfone anion exchange membrane solution containing 15 wt. % (mass concentration) of quaternized polyethersulfone was blade-coated on a substrate, and dried to obtain an anion exchange membrane layer.
(2) The anion exchange membrane layer obtained in step (1) was sequentially immersed in a 0.3 g/L sodium alginate solution and a mixed solution with a total concentration of metal ions of 80 mM (nickel:cobalt:magnesium=1:1:2) for hydrogel cross-linking, 20 min in each solution, for 5 cycles, thereby obtaining a hydrogel anion exchange membrane.
(3) The hydrogel anion exchange membrane obtained in step (2) was sequentially immersed in a mixed solution with a total concentration of metal ions (zinc:iron=1:1) of 0.3 M and a 500 mM sodium hydroxide alkaline solution, 1 h in each solution, thereby obtaining a layered bimetallic hydroxide-based hydrogel anion exchange membrane.
(4) A sulfonated polyethersulfone cation exchange membrane solution containing 8 wt. % (mass concentration) of sulfonated polyethersulfone was blade-coated on the layered bimetallic hydroxide-based hydrogel anion exchange membrane obtained in step (3), and dried to obtain the layered bimetallic hydroxide-based hydrogel bipolar membrane.

A current-potential curve of the layered bimetallic hydroxide-based hydrogel bipolar membrane prepared in Example 3, tested in a 500 mmol/L NaCl electrolyte solution, with platinum sheets as a counter electrode and a working electrode, and Ag/AgCl electrodes as a reference electrode and a working sensing electrode, shows that at the current density of 100 mA/cm², the voltage required for water dissociation of the bipolar membrane is 2.41 V.

Example 4

This example provides a method for preparing a layered bimetallic hydroxide-based hydrogel bipolar membrane, specifically including:
(1) A quaternized polyethersulfone anion exchange membrane solution containing 10 wt. % (mass concentration) of quaternized polyethersulfone was blade-coated on a substrate, and dried to obtain an anion exchange membrane layer.
(2) The anion exchange membrane layer obtained in step (1) was sequentially immersed in a 0.2 g/L sodium alginate solution and a mixed solution with a calcium ion concentration of 70 mM for hydrogel cross-linking, 15 min in each solution, for 2 cycles, thereby obtaining a hydrogel anion exchange membrane.
(3) The hydrogel anion exchange membrane obtained in step (2) was sequentially immersed in a mixed solution with an iron ion concentration of 1 M and a 1000 mM sodium hydroxide alkaline solution, 0.3 h in each solution, thereby obtaining a layered bimetallic hydroxide-based hydrogel anion exchange membrane.
(4) A sulfonated polyethersulfone cation exchange membrane solution containing 15 wt. % (mass concentration) of sulfonated polyethersulfone was blade-coated on the layered bimetallic hydroxide-based hydrogel anion exchange membrane obtained in step (3), and dried to obtain the layered bimetallic hydroxide-based hydrogel bipolar membrane.

A current-potential curve of the layered bimetallic hydroxide-based hydrogel bipolar membrane prepared in Example 4, tested in a 500 mmol/L NaCl electrolyte solution, with platinum sheets as a counter electrode and a working electrode, and Ag/AgCl electrodes as a reference electrode and a working sensing electrode, shows that at the current density of 100 mA/cm², the voltage required for water dissociation of the bipolar membrane is 2.21 V.

Example 5

This example provides a method for preparing a layered bimetallic hydroxide-based hydrogel bipolar membrane, specifically including:
(1) A quaternized polyethersulfone anion exchange membrane solution containing 8 wt. % (mass concentration) of quaternized polyethersulfone was blade-coated on a substrate, and dried to obtain an anion exchange membrane layer.
(2) The anion exchange membrane layer obtained in step (1) was sequentially immersed in a 0.1 g/L sodium alginate solution and a mixed solution with a total concentration of metal ions of 60 mM (copper:iron:calcium=1:1:2) for hydrogel cross-linking, 30 min in each solution, for 5 cycles, thereby obtaining a hydrogel anion exchange membrane.
(3) The hydrogel anion exchange membrane obtained in step (2) was sequentially immersed in a mixed solution with a total concentration of metal ions (copper:iron=1:2) of 0.6 M and a 10 mM sodium hydroxide alkaline solution, 1 h in each solution, thereby obtaining a layered bimetallic hydroxide-based hydrogel anion exchange membrane.
(4) A sulfonated polyethersulfone cation exchange membrane solution containing 8 wt. % (mass concentration) of sulfonated polyethersulfone was blade-coated on the layered bimetallic hydroxide-based hydrogel anion exchange membrane obtained in step (3), and dried to obtain the layered bimetallic hydroxide-based hydrogel bipolar membrane.

A current-potential curve of the layered bimetallic hydroxide-based hydrogel bipolar membrane prepared in Example 5, tested in a 500 mmol/L NaCl electrolyte solution, with platinum sheets as a counter electrode and a working electrode, and Ag/AgCl electrodes as a reference electrode and a working sensing electrode, shows that at the current density of 100 mA/cm², the voltage required for water dissociation of the bipolar membrane is 1.69 V.

Comparative Example 1

This comparative example provides a method for preparing a hydrogel bipolar membrane without layered bimetallic hydroxide, specifically including:
(1) A quaternized polyethersulfone anion exchange membrane solution containing 10 wt. % (mass concentration) of quaternized polyethersulfone was blade-coated on a substrate, and dried to obtain an anion exchange membrane layer.

(2) The anion exchange membrane layer obtained in step (1) was sequentially immersed in a 0.2 g/L sodium alginate solution and a mixed solution with a calcium ion concentration of 100 mM for hydrogel crosslinking, 10 min in each solution, for 2 cycles, thereby obtaining a hydrogel anion exchange membrane.

(3) A sulfonated polyethersulfone cation exchange membrane solution containing 10 wt. % (mass concentration) of sulfonated polyethersulfone was blade-coated on the hydrogel anion exchange membrane obtained in step (2), and dried to obtain the hydrogel bipolar membrane without layered bimetallic hydroxide.

Figure 7:
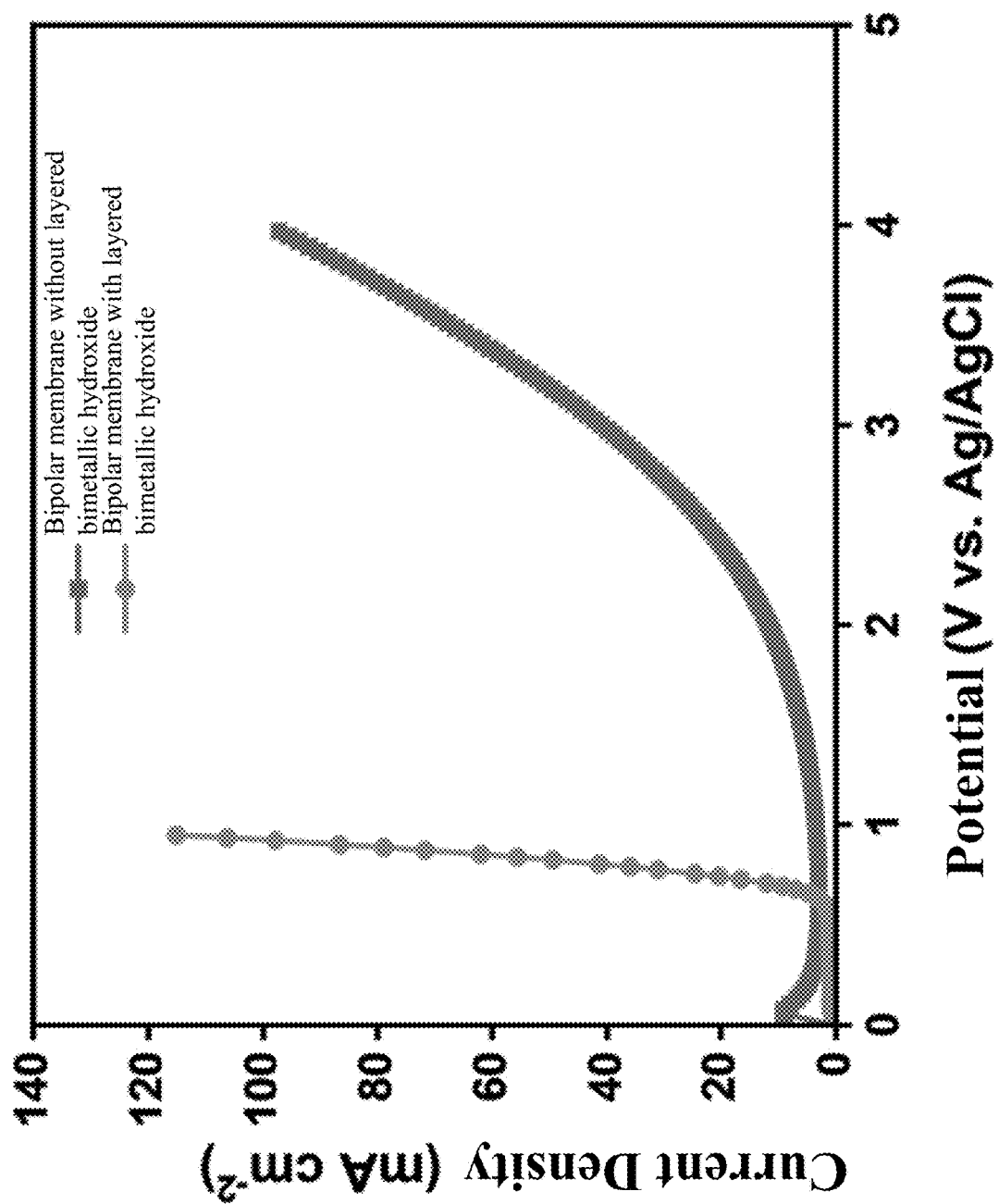
FIG. 7 is a comparison diagram of current-potential curves of the layered bimetallic hydroxide-based hydrogel bipolar membrane prepared in Example 1 and the hydrogel bipolar membrane without layered bimetallic hydroxide prepared in Comparative Example 1.

A current-potential curve of the hydrogel bipolar membrane without layered bimetallic hydroxide prepared in Comparative Example 1, tested in a 500 mmol/L NaCl electrolyte solution, with platinum sheets as a counter electrode and a working electrode, and Ag/AgCl electrodes as a reference electrode and a working sensing electrode, is shown in FIG. 7. The result shows that at the current density of 100 mA/cm$^2$, the voltage required for water dissociation of the bipolar membrane is 4.03 V, which is less than 0.93 V of the layered bimetallic hydroxide-based hydrogel bipolar membrane.

Comparative Example 2

This comparative example provides a method for preparing a layered bimetallic hydroxide bipolar membrane without hydrogel, specifically including:

(1) A quaternized polyethersulfone anion exchange membrane solution containing 10 wt. % (mass concentration) of quaternized polyethersulfone was blade-coated on a substrate, and dried to obtain an anion exchange membrane layer.

(2) The anion exchange membrane layer obtained in step (1) was immersed in a mixed solution with a total concentration of metal ions of 100 mM (nickel:iron=1:1), thereby obtaining an anion exchange membrane without hydrogel.

(3) The anion exchange membrane without hydrogel obtained in step (2) was sequentially immersed in a mixed solution with a total concentration of metal ions (nickel:iron=1:1.5) of 0.5 M and a 50 mM sodium hydroxide alkaline solution, 0.2 h in each solution, thereby obtaining a layered bimetallic hydroxide anion exchange membrane without hydrogel.

(4) A sulfonated polyethersulfone cation exchange membrane solution containing 10 wt. % (mass concentration) of sulfonated polyethersulfone was blade-coated on the layered bimetallic hydroxide anion exchange membrane without hydrogel obtained in step (3), and dried to obtain the layered bimetallic hydroxide bipolar membrane without hydrogel.

Figure 8:
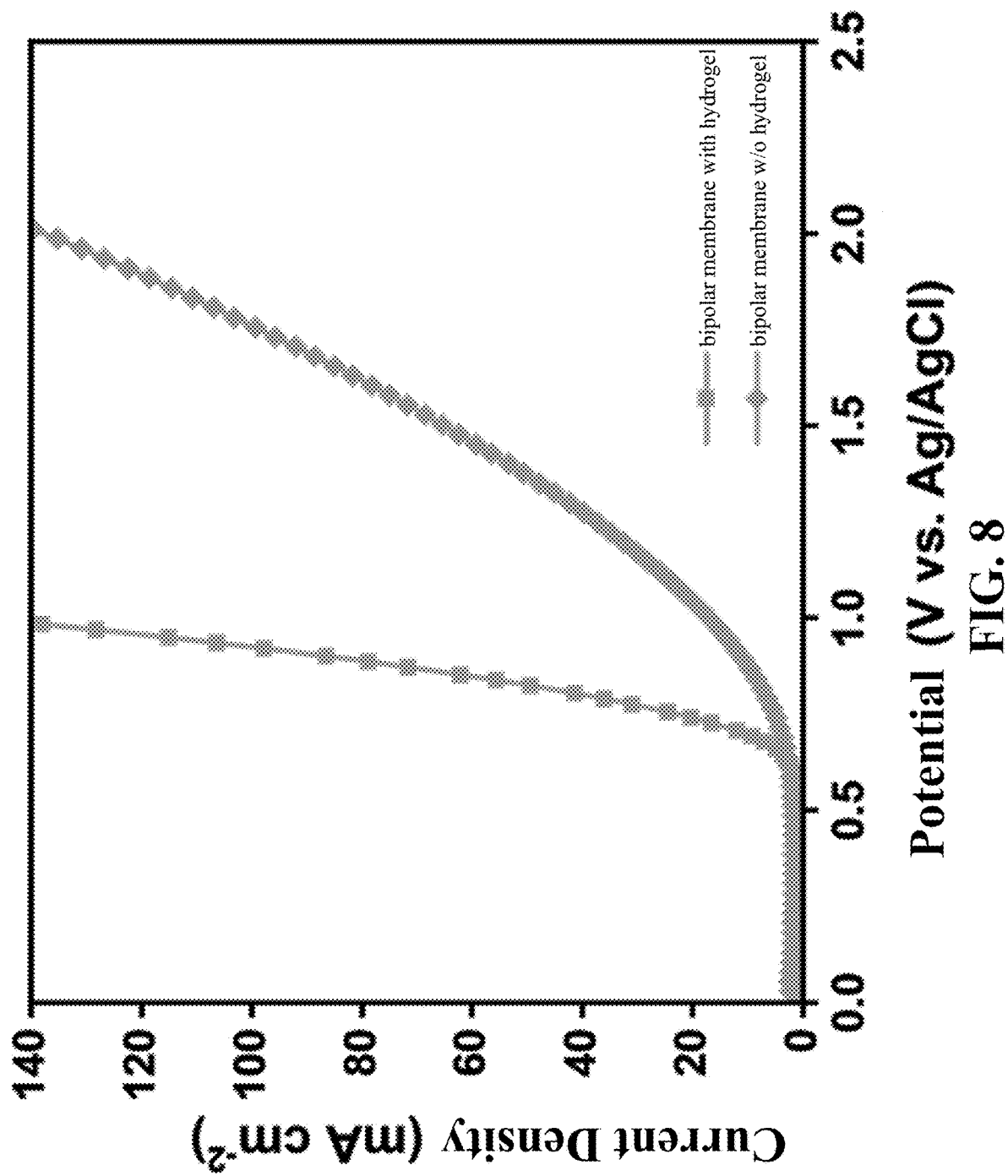
FIG. 8 is a comparison diagram of current-potential curves of the layered bimetallic hydroxide-based hydrogel bipolar membrane prepared in Example 1 and a layered bimetallic hydroxide bipolar membrane without hydrogel prepared in Comparative Example 2.

A current-potential curve of the layered bimetallic hydroxide bipolar membrane without hydrogel prepared in Comparative Example 2, tested in a 500 mmol/L NaCl electrolyte solution, with platinum sheets as a counter electrode and a working electrode, and Ag/AgCl electrodes as a reference electrode and a working sensing electrode, is shown in FIG. 8. The result shows that at the current density of 100 mA/cm$^2$, the voltage required for water dissociation of the bipolar membrane is 1.76 V, which is less than 0.93 V of the layered bimetallic hydroxide-based hydrogel bipolar membrane. This indicates that the coupling design of the hydrogel and the layered bimetallic hydroxide is a necessary link to realize a high-performance bipolar membrane.

It should be understood that the applications of the present disclosure are not limited to the above examples. Those skilled in the art can make improvements or changes according to the above description, and all these improvements and changes shall fall into the scope of the appended claims of the present disclosure.

What is claimed is:

1. A method for preparing a layered bimetallic hydroxide-based hydrogel bipolar membrane, comprising:
blade-coating a quaternized polyethersulfone anion exchange membrane solution on a substrate, and carrying out drying to obtain an anion exchange membrane layer;
immersing the anion exchange membrane layer sequentially and cyclically in a sodium alginate solution and a first metal ion mixed solution for hydrogel crosslinking to obtain a hydrogel anion exchange membrane;
immersing the hydrogel anion exchange membrane sequentially in a second metal ion mixed solution and an alkaline solution to obtain a layered bimetallic hydroxide-based hydrogel anion exchange membrane; and
blade-coating a sulfonated polyethersulfone cation exchange resin solution on the layered bimetallic hydroxide-based hydrogel anion exchange membrane, and carrying out drying to obtain the layered bimetallic hydroxide-based hydrogel bipolar membrane.

2. The method for preparing a layered bimetallic hydroxide-based hydrogel bipolar membrane according to claim 1, wherein the quaternized polyethersulfone anion exchange membrane solution comprises an organic solvent and quaternized polyethersulfone powder particles dispersed in the organic solvent, a mass concentration of the quaternized polyethersulfone anion exchange membrane solution being 1-20 wt. %.

3. The method for preparing a layered bimetallic hydroxide-based hydrogel bipolar membrane according to claim 1, wherein the anion exchange membrane layer has a thickness of 10-100 μm.

4. The method for preparing a layered bimetallic hydroxide-based hydrogel bipolar membrane according to claim 1, wherein a concentration of the sodium alginate solution is 0.01-2 g/L, and a total molar concentration of metal ions in the first metal ion mixed solution is 1-1000 mM.

5. The method for preparing a layered bimetallic hydroxide-based hydrogel bipolar membrane according to claim 1, wherein a total molar concentration of metal ions in the second metal ion mixed solution is 0.01-5 M.

6. The method for preparing a layered bimetallic hydroxide-based hydrogel bipolar membrane according to claim 1, wherein the first metal ion mixed solution and the second metal ion mixed solution are independently selected from one or more of magnesium, calcium, aluminum, iron, cobalt, nickel, copper, zinc, and manganese.

7. The method for preparing a layered bimetallic hydroxide-based hydrogel bipolar membrane according to claim 1, wherein the alkaline solution is one or more of sodium hydroxide, sodium carbonate, sodium bicarbonate, potassium hydroxide, potassium carbonate, and potassium bicarbonate.

8. The method for preparing a layered bimetallic hydroxide-based hydrogel bipolar membrane according to claim 1, wherein the hydrogel anion exchange membrane is immersed in the second metal ion mixed solution for 0.01-10 h, and in the alkaline solution for 0.01-10 h.

9. The method for preparing a layered bimetallic hydroxide-based hydrogel bipolar membrane according to claim 1, wherein the sulfonated polyethersulfone cation exchange membrane solution comprises an organic solvent and sulfonated polyethersulfone powder particles dispersed in the organic solvent, a mass concentration of the sulfonated polyethersulfone cation exchange membrane solution being 1-20 wt. %.

\* \* \* \* \*